United States Patent [19]

Giler et al.

[11] Patent Number: 5,291,546
[45] Date of Patent: Mar. 1, 1994

[54] FAX MESSAGE SYSTEM

[75] Inventors: Eric R. Giler, Wellesley Hills; David W. Duehren, Belmont, both of Mass.

[73] Assignee: Brooktrout Technology, Inc., Needham, Mass.

[21] Appl. No.: 721,915

[22] Filed: Jun. 20, 1991

Related U.S. Application Data

[63] Continuation of Ser. No. 348,592, May 8, 1989, abandoned.

[51] Int. Cl.[5] .......................................... H04M 11/00
[52] U.S. Cl. .................................. 379/100; 379/98; 379/97; 379/93; 358/402; 358/403; 358/407
[58] Field of Search ............... 379/100, 93, 94, 233, 379/214, 210; 358/402, 403, 407

[56] References Cited

U.S. PATENT DOCUMENTS

| | | | |
|---|---|---|---|
| 4,629,831 | 12/1986 | Curtin et al. | 379/233 |
| 4,652,700 | 3/1987 | Matthews et al. | 379/100 |
| 4,755,985 | 7/1988 | Jayapalan | 379/113 |
| 4,763,191 | 8/1988 | Gordon et al. | 379/94 |
| 4,792,967 | 12/1988 | Ladd et al. | 379/67 |
| 4,797,913 | 1/1989 | Kaplan et al. | 379/94 |
| 4,811,381 | 3/1989 | Woo et al. | 379/233 |
| 4,837,798 | 6/1989 | Cohen et al. | 379/94 |
| 4,866,758 | 9/1989 | Heinzelmann | 379/94 |
| 4,930,153 | 5/1990 | Hagedorn | 379/233 |
| 4,935,955 | 6/1990 | Neudorfer | 358/402 |
| 4,969,184 | 11/1990 | Gordon et al. | 379/100 |
| 4,975,941 | 12/1990 | Morganstein et al. | 379/233 |
| 4,994,926 | 2/1991 | Gordon et al. | 379/100 |

Primary Examiner—Curtis Kuntz
Assistant Examiner—Stella L. Woo
Attorney, Agent, or Firm—Hamilton, Brook, Smith & Reynolds

[57] ABSTRACT

A method for causing information including at least FAX messages sent via a telephone system to be subjected to prespecified actions at a FAX receiving station. A telephone call is initiated via the telephone system to the FAX receiving station by dialing a telephone number sufficient to route the telephone call to the FAX receiving station, the telephone number also being sufficient to determine the prespecified actions to which the FAX message is to be subjected at the receiving end. The telephone number is carried through the telephone system in the form of a telephone address signal as part of the call initiation process. The telephone call being initiated is directed to the FAX receiving station, based on the telephone address signal. The telephone call is answered at the FAX receiving station, and the telephone address signal is received at the FAX receiving station. Action information is stored which associates with each possible telephone address signal, a prespecified action to be taken with respect to each received FAX message corresponding to the telephone address signal. When the call has been established, the FAX message is sent via the telephone system to the FAX receiving station. The sent FAX message is received at the FAX receiving station. Then the received FAX message is handled in accordance with the prespecified action.

16 Claims, 5 Drawing Sheets

| FAX Address | Mailbox |
|---|---|
| A | JONES |
| B | SMITH |
| C | JOHNSON |

FAX MESSAGE SYSTEM

This is a continuation of copending application Ser. No. 07/348,592 filed on May 8, 1989, now abandoned.

BACKGROUND OF THE INVENTION

This invention relates to facsimile (FAX) communication.

Typically, in FAX communication, a FAX machine is connected directly via a telephone company line to the telephone company central office for access to the public switched telephone network. When remote telephone subscriber wants to send a facsimile to a local FAX machine, he gets access to the local FAX machine by dialing its telephone number. When the FAX machine answers, the remote telephone subscriber sends his FAX message.

When the sending party wants to identify the person who is to receive the FAX message, he typically writes that information on a cover sheet; someone at the local FAX machine then delivers the FAX message to the intended recipient based on the information on the cover sheet. In some FAX systems, the intended recipients can be indicated electronically by information which is exchanged after the call has been established. Typically, the information is communicated in accordance with a proprietary protocol restricted to machines of a given manufacturer.

One such scheme uses binary information that is passed (using Non-standard Facilities) as part of the FAX machine handshake. For example, the CCITT standard T.30 permits the use of Non-standard Facilities for providing such information. Such Non-standard Facilities have been used, for example, to set up mailbox facilities for FAX messages with the calling machine identifying the mailbox at the called machine to which the FAX message is to be delivered.

In a second arrangement, a FAX machine would use DTMF tones, sent by the originating FAX machine after the call has been established, to identify the intended recipient.

A third proposed technique would rely on special visible markings, on the first or each page of the FAX message, that would be recognized by the receiving FAX machine.

SUMMARY OF THE INVENTION

In general, in one aspect, the invention features a method for causing information including at least a FAX message sent via a telephone system to be subjected to prespecified actions at a receiving station. In this feature, a telephone call is initiated via the telephone system to the receiving station by dialing a telephone number enabling the telephone call to be routed to the receiving station, the telephone number also indicating the prespecified action to which a message is to be subjected at the receiving end. The telephone number is passed through the telephone system in the form of a telephone address signal as part of the call initiation process, and the telephone call is thus directed to the FAX receiving station based on the telephone address signal. At the FAX receiving station, the telephone call is answered and the telephone address signal is received. When the call has been established, the FAX message is sent via the telephone system to and received at the FAX receiving station. Stored action information associates each possible telephone address signal with a prespecified action to be taken with respect to each received FAX message corresponding to the telephone address signal. The received FAX message is handled in accordance with the prespecified action.

Preferred embodiments of the invention include the following features The prespecified action may be to route the FAX message to an intended recipient, or to another location in a network of computers to which the FAX receiving station is connected, or to a mailbox associated with an intended recipient. The telephone address signal is a direct inward dialing (DID) telephone address signal. The intended recipient is one or more of a FAX device, a voice telephone set, a modem, or an answering machine, and the information is one or more of a FAX message, a voice, or modulated data.

In general, in another aspect, the invention features a FAX receiving station which includes (i) a FAX message receiver which answers the telephone call, receives the telephone address signal, and, when the call has been established, receives the FAX message via the telephone system, and (ii) storage for storing the action information. The FAX receiving station is arranged to handle the received FAX message in accordance with the prespecified action based on the telephone address signal.

Preferred embodiments include the following features. The receiver has a telephone port for connection to a DID trunk line. The receiver comprises a circuit board for insertion in a backplane of a personal computer. A network of communicating digital devices may be connected to the receiving station.

In general, in another aspect, the invention features a method for causing different messages each of which is expressed in one of possibly any two of the following modes—voice, FAX, and modulated data—and each of which is sent via a telephone system, to be handled in accordance with the proper mode at a receiving station; the telephone address signal is indicative of the mode, and mode information is stored which associates with each possible telephone address signal, a prespecified mode with respect to each received message corresponding to the telephone address signal. When the call has been established, the message is sent via the telephone system to the receiving station, and handled at the receiving station in accordance with the prespecified mode.

Other advantages and features will become apparent from the following description of the preferred embodiments, and from the claims.

DESCRIPTION OF THE PREFERRED EMBODIMENTS

We first briefly describe the drawings.

STRUCTURE AND OPERATION

Figure 1:
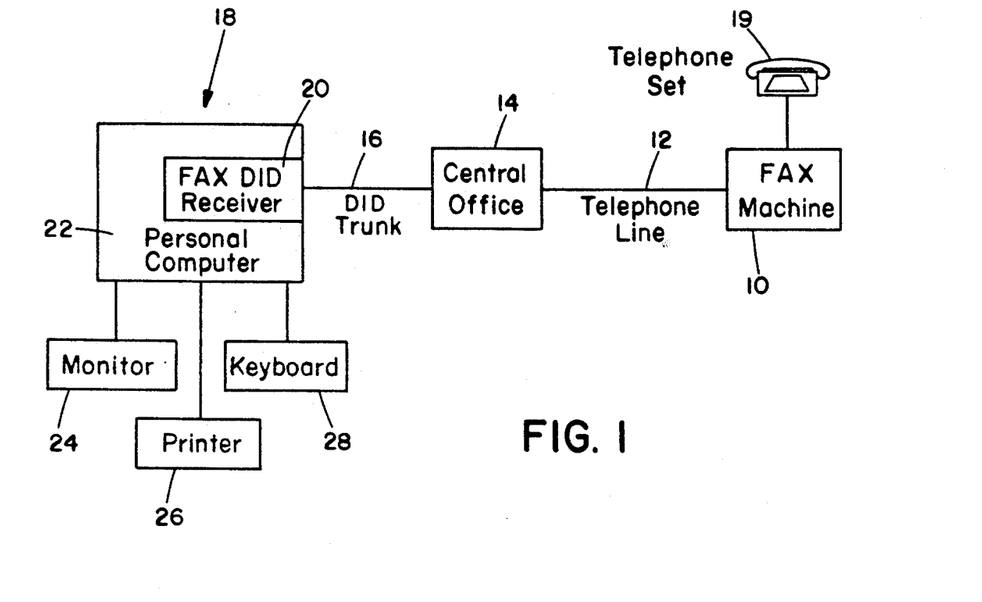
FIG. 1 is a block diagram of a FAX communication system.

Referring to FIG. 1, in a FAX communication system, a conventional FAX machine 10 is connected via a standard telephone line 12 to the telephone company central office 14. The central office 14 is in turn connected via a direct inward dialing (DID) trunk 16 to a FAX receiving station 18.

For purposes of dialing the telephone number of the FAX receiving station 18, the originating FAX machine 10 may use a telephone set 19 (or the FAX machine may have internal telephone dialing capabilities).

The DID trunk is provided as a service by the telephone company to enable, for example, direct dialing access from the public switched telephone system to specific individual telephone stations served by a private branch exchange (PBX) without requirinq intervention by the operator of the PBX. In that case, the PBX serves as a satellite of the central telephone system, making the final connection to the telephone being called, but without passing the address signals to the called telephone.

In another use of DID trunk lines, direct dialing access is provided from public telephone stations to CENTREX central office stations. In either case, the DID trunk leading to the PBX or the trunk leading to the CENTREX central office station carries an address signal which indicates the telephone number of the station being called. An address signal may, for example, be the last several digits of the dialed telephone number. The PBX or the CENTREX station (called the terminal) then routes the call to the proper station based on the address signal. Typically several addresses (telephone numbers) are served by a single DID trunk line. Only one call can be active on a DID trunk at any time, but often several DID trunks are connected in parallel to the terminal to minimize blocking of calls. (Additional information concerning DID service is set forth in *Notes on the BOC Lata Networks,* 1983, published by AT&T.)

This arrangement differs from conventional telephone call switching in which the central office simply connects the originator's line to the called station's line through a switching network but does not pass any address signals along the called station s line.

The DID address signals are one type of telephone address signals which are carried on the line at the time the call is initiated and before the call is completed and are typically used by the public telephone system for routing the call. In this sense they differ from the kind of address information that may be entered by a calling party via the touch-tone keypad after a call has been established. Such touch-tone address information has been used for example to specify the recipient of a voice message in a voice messaging system or to specify the recipient of FAX messages as disclosed in copending U.S. patent application Ser. No. 192,839, filed May 11, 1988.

In FIG. 1, the DID trunk line is connected directly to a FAX DID receiver board 20 held in the backplane of a conventional personal computer 22, so that the address signals are received directly by the receiver board 20. The personal computer may have optional peripherals including a monitor 24, a printer 6 and a keyboard 28.

Figure 2:
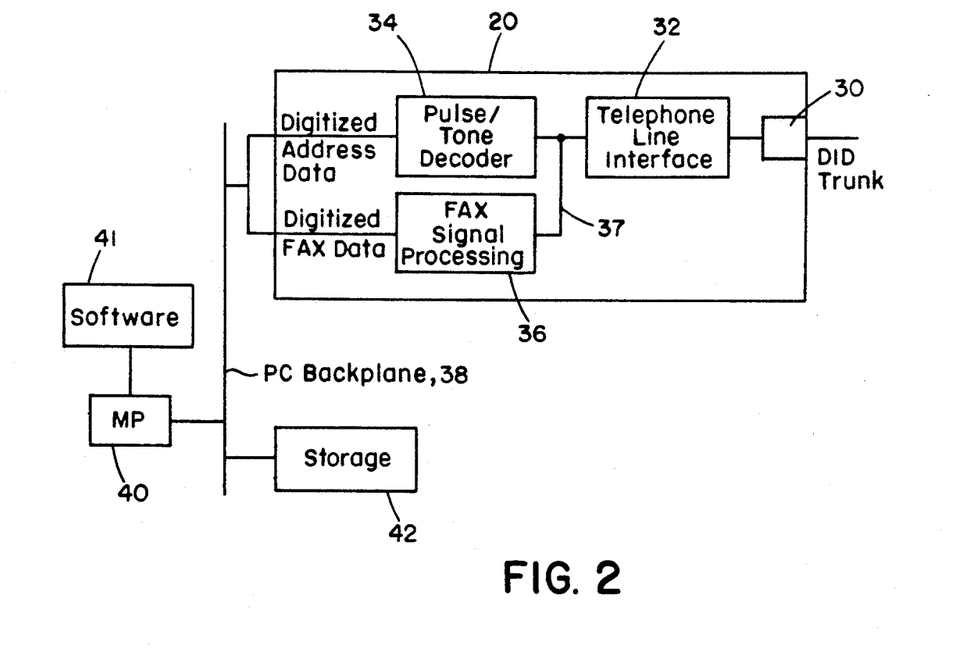
FIG. 2 is a block diagram of portions of a personal computer and the FAX DID receiver shown in FIG. 1.

Referring to FIG. 2, receiver board 20 includes a conventional telephone jack 30 to receive the DID trunk. The jack is connected to a standard telephone line interface 32 whose output is fed both to a pulse/tone decoder 34 and a FAX signal processor 36. The output of the decoder 34 is a FAX address corresponding to the digits of the DID address signal received from the DID trunk.

The FAX signal processor 36 includes a modem and other circuitry for converting the analog FAX signals on line 37 to digitized FAX data constitutinq a FAX message. The FAX address and the FAX message are delivered to the PC backplane 38.

A microprocessor 40, under control of software 41, examines the FAX address of each FAX message and routes the FAX message in accordance with the FAX address. Initially, and in some cases only temporarily, the FAX message may be stored in storage 42 for later use.

Figure 3:
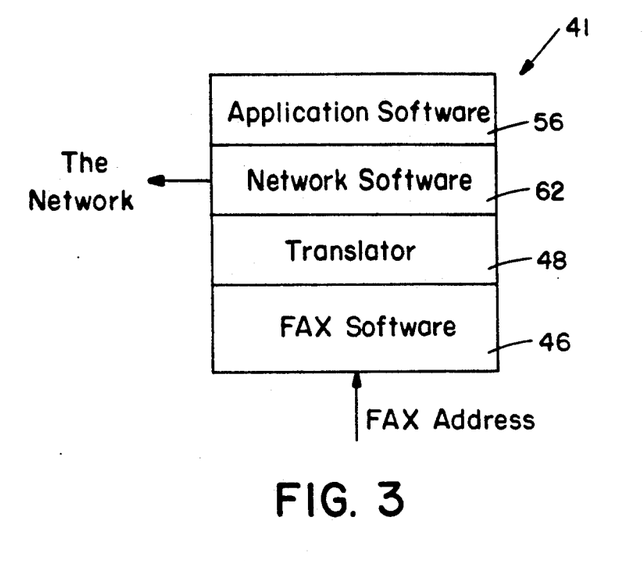
FIG. 3 is a diagram of software layers for controlling the system.

Referring to FIG. 3, software 41 includes FAX software 46 which receives the FAX address and, among other things, can pass the FAX address to a translator 48. The FAX software may also manage one or more FAX boards (including a mix of FAX DID receivers and conventional FAX receiver boards). In the case of FAX DID receivers, the software manages the incoming calls and storage of the FAX messages.

Figure 4:
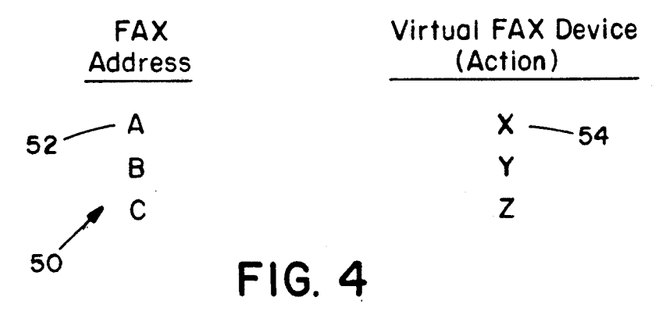
FIG. 4 is a table of actions to be taken.

Referring to FIG. 4, the translator uses a table 50 to determine what action to take with respect to the FAX message associated with each received FAX address. Table 50 associates each valid FAX address 52 with an entry 54 that indicates an action to be taken with respect to the FAX message associated with the FAX address. Thus the table provides, in effect, a logical FAX address space in which the valid FAX addresses represent logical destinations of FAX messages, while the entries 54 represent virtual FAX device destinations. The table allows for the identification of FAX devices which are not necessarily real FAX machines but may be virtual machines For example, a FAX device may actually be implemented as a personal computer having a disk drive that stores the FAX message and a CRT that displays the FAX message to the user upon request. The table also allows simply for an action to be taken with respect to a FAX message without specifying a particular FAX device at all.

An almost limitless variety of virtual FAX devices and actions can be included as entries 54 of the table.

For example, the virtual FAX device associated with a given FAX address may be the same personal computer 18 which is connected to the DID trunk. In that case, the translator may alert application software 56 located in that personal computer that a FAX message has been received. The application software could then perform any of a variety of actions. For example, it could alert the user of that personal computer that a message has been received, and when the user asks to see the message, it could fetch it from storage 42 and display it. Or the application software could be arranged to immediately print on the printer any received FAX message directed to that personal computer.

Figure 5:
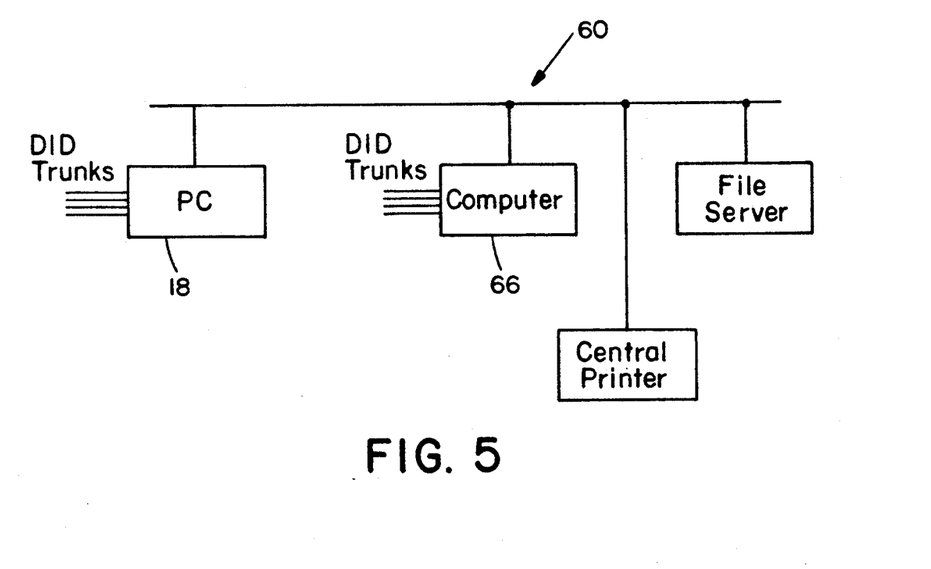
FIG. 5 is a block diagram of a network.

Referring to FIG. 5, in another example, personal computer 18 could be connected to a local area or wide area network 60 having other PCs, file servers, printers, and any other desired combination of computers and peripheral devices. The FAX address could then indicate the address of a device on the network and the translator could pass the entry 54 to network software 62 (FIG. 3) which would then fetch the message from storage 42 and route it via the network to its intended destination. Network software 62 would in part be commercially available network software used to connect the system to the network and in part specialized software for moving the FAX messages through the network. In some cases, the FAX message will be stored locally before being forwarded. In others it will be forwarded as received.

Figure 7:
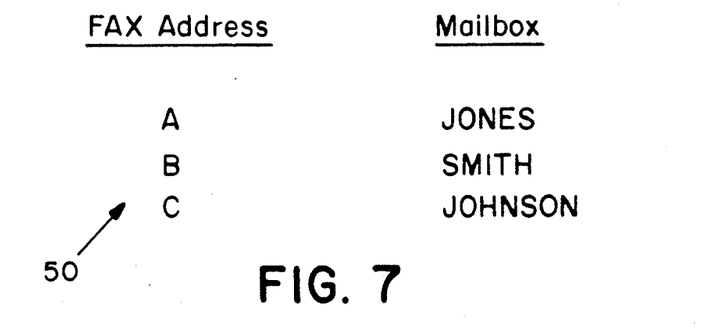
FIG. 7 is another table of actions to be taken.

Referring to FIG. 7, in another example, each FAX address in table 50 could be associated with an electronic mailbox for a recipient of FAX messages. For example, FAX address A could be associated with a mailbox for Ms. Jones. Any FAX message bearing address A would be routed to Ms. Jones' mailbox and would be accessible to her from, e.g., a PC.

FAX message mailboxes could be arranged to be accessible in separate deposit only and retrieve only modes. This would allow people who wish to reach a given person to send the FAX message to his mailbox by calling a DID telephone number reserved for incoming messages. The recipient could then retrieve his messages from his mailbox by calling a different DID telephone number reserved for that purpose. Or retrieval could be accomplished using available polling capabilities in a FAX machine which would directly request and receive the stored FAX message, for example under the T.30 protocol, without requiring a touch-tone capability.

Figure 8:
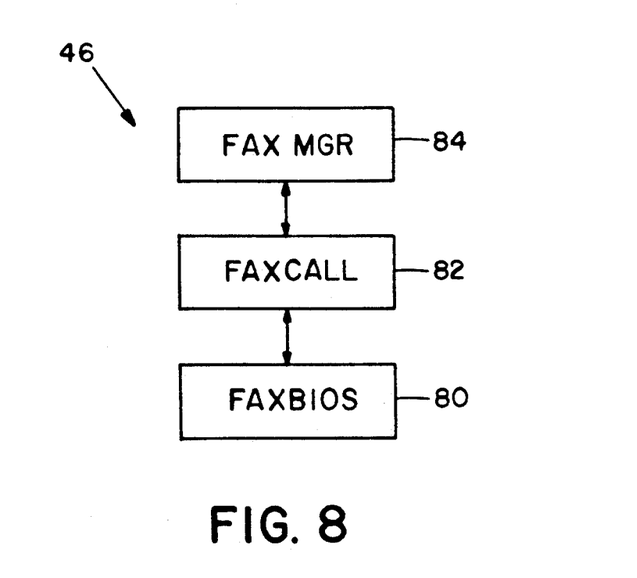
FIG. 8 is a diagram of the possible organization of portions of the software.

Referring to FIG. 8, one possible structure for the FAX software 46 and translator 48 (FIG. 8) would be a modular architecture with three modules: FAXBIOS 80, FAXCALL 82, and FAXMGR 84.

The FAXBIOS would be a low level driver that would interface directly to one or more FAX DID receiver boards 20. Among other things, it would (i) handle interrupts from the board, (ii) send commands to the board, (iii) schedule direct memory accesses (DMAs), (iv) configure the board after a reset command, and (v) include data buffers for each FAX message channel. FAXBIOS would interact with a particular board design in a way that hides the peculiarities of the board design from the software that interacts with the FAXBIOS module.

FAXCALL would handle both incoming and outgoing FAX message calls. FAXCALL would interact with the board through FAXBIOS, e.g., by sending commands (such as a command to dial a telephone number) to FAXBIOS. It would also respond to interrupts that are passed to it via FAXBIOS and would manage the filling and emptying of the data buffers.

For initiating a call, FAXCALL would receive (via a queue in the case of concurrent DOS, or a socket or stream in the case of UNIX) a packet of information identifying the line to call out on, the phone number to call, and a file descriptor for the files to be sent. It then sends the appropriate commands and follows an appropriate procedure to send those files. During the data phase of the call, it would keep the data buffers in the FAXBIOS full with data from the disk until the file is completely sent. It would also report back the status of each page sent and/or errors.

For incoming calls, FAXCALL would store the incoming data into a file and report the status of the call. During the data phase of the call, it would empty the data buffers in the FAXBIOS into a file on a disk. Where the incoming file is stored may depend on routing information received from the board. That routing information could be received immediately in the case of a FAX DID receiver or from some other source later. Storage of the incoming FAX message could occur on a remote drive in a network environment.

The FAXMGR routine would manage a database of calls and files using a commercially available or custom made database manager packaqe (e.g., C-trieve). FAXMGR would serve as a scheduler to send packets for outqoinq messages to FAXCALL. For incoming calls, it would contain the table 50 (FIG. 4) and the translator 48 of FIG. 3. FAXMGR would also manage the storage of old FAX message files. The data base would include lists of phone numbers to call and their associated files, and records of what files have been received, and an activity log indicating the status for every page that has been sent or received. A debug mode would record the FSK handshaking sequence performed by a particular FAX port.

In addition specific application programs would allow the creation of the files that will be scheduled by FAXMGR, and utility programs would permit viewing the status of the system for a serial terminal and would provide remote diagnostics.

Figure 9:
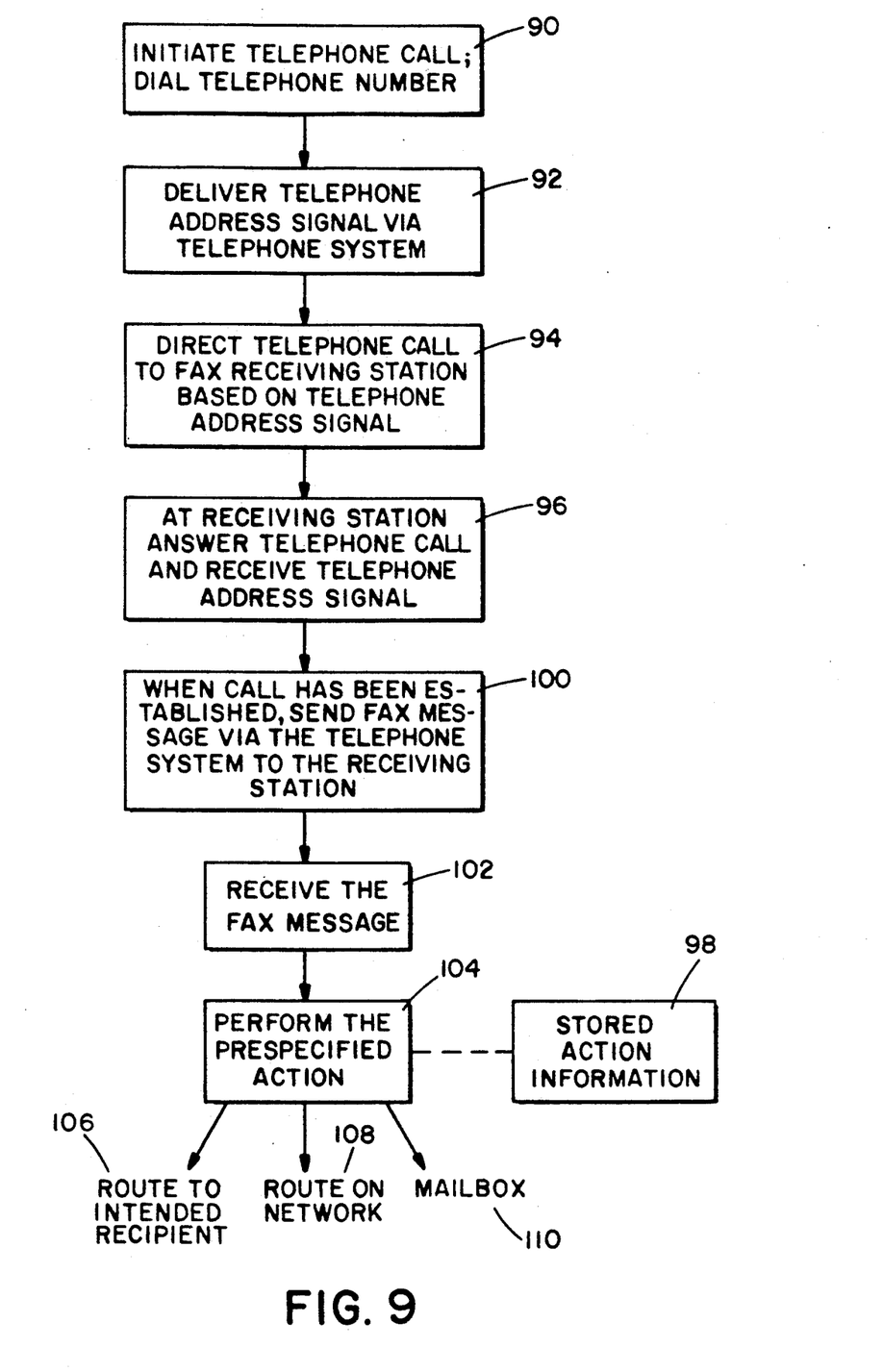
FIG. 9 is a flow chart of the process of sending a FAX message.

Referring to FIG. 9, in operation, a telephone call would be initiated (90) via the telephone system to the FAX receiving station by dialing a telephone number sufficient to route the telephone call to the FAX receiving station, the telephone number also being sufficient to determine the prespecified action to which the FAX message is to be subjected at the receiving end. The telephone number is carried through the telephone system (92) in the form of a telephone address signal as part of the call initiation process. The telephone call being initiated is then directed (94) to the FAX receiving station, based on the telephone address signal. The telephone call is answered (96) at the FAX receiving station and the telephone address signal is received. Stored action information (98) associates each possible telephone address signal with a prespecified action to be taken with respect to each received FAX message corresponding to the telephone address signal. When the call has been established, the FAX message is sent (100) via the telephone system to the FAX receiving station. The sent FAX message is received (102) at the FAX receiving station and handled (104) in accordance with the prespecified action. For example, the action may involve routing the FAX message to an intended recipient (106), routing the FAX message to another location in a network of computers to which the FAX receiving station is connected (108), or passing the FAX message to a mailbox (110) associated with an intended recipient.

Other embodiments are within the following claims. Personal computer 18 may have multiple receiver boards 20, each connected to a DID trunk, in order to handle a greater number of simultaneously incoming calls And other computers 66 in the network may also have receiver boards connected to possibly multiple DID trunks.

Figure 6:
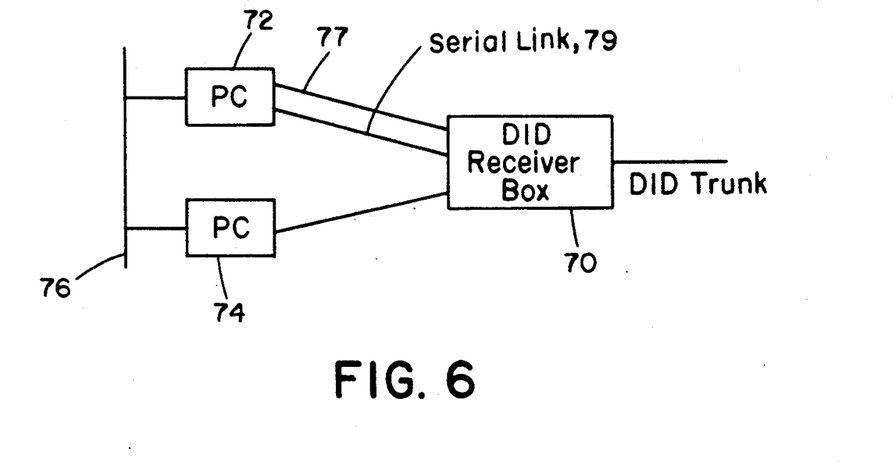
FIG. 6 is a block diagram of a second embodiment.

Referring to FIG. 6, in another embodiment, the DID trunk can be connected by a telephone line 77 to a separate DID receiver box 70 which sends FAX messages to various personal computers 72, 74, each capable of routing the FAX message to an intended destination, e.g., another device on a network 76, based on address information provided by the DID receiver box. In this case, the DID receiver box 70 would receive the DID address signals, determine which PC the FAX message is intended for, generate ringing signals to be answered by a receiver board in the PC, and, after the PC answers, would pass the FAX message directly through to the PC. The DID would also temporarily store the DID address signals, convert them to digits, and pass the digits along to the PC. The PC would then route the FAX message or take action on it in accordance with the digits and based on a table like the table in FIG. 4.

In FIG. 6, alternatively a command corresponding to the ring signal and/or the address information could be sent from the DID receiver box to one or more of the PCs over a serial link 79 connected to the serial port of the PC.

Table 50 can be updated as often as needed to reflect the desired relationships between FAX addresses and corresponding actions.

The FAX receiver 20 of FIG. 1 could be replaced by a stand-alone unit having other capabilities (e.g., modem features) or a normal FAX machine having FAX message storage capabilities, or any device capable of receiving FAX messages, storing them, and acting on address information to route a FAX message to an intended recipient.

Figure 10:
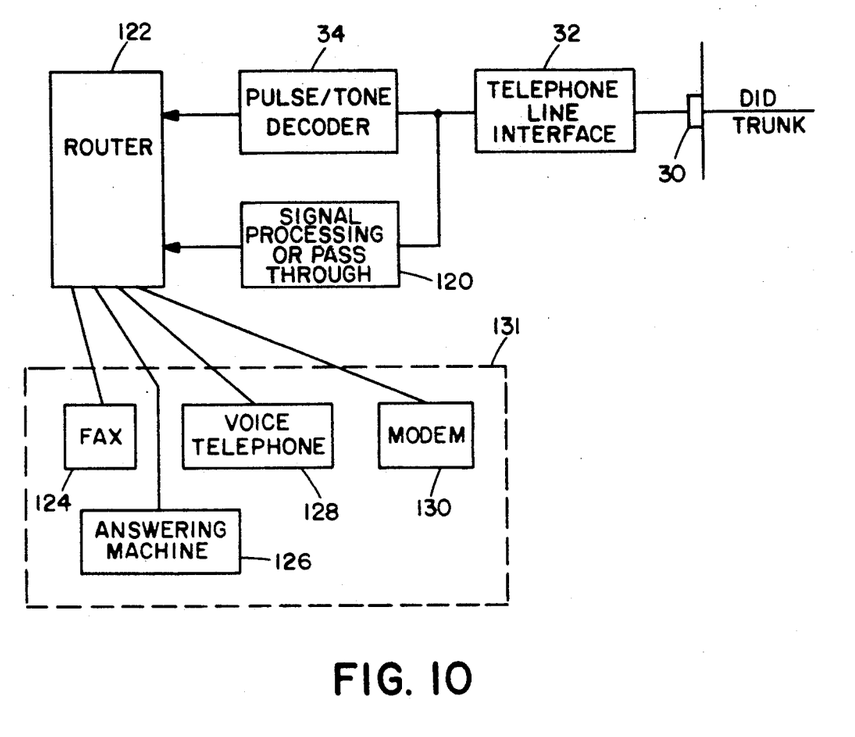
FIGS. 10 and 11 are block diagrams of alternative embodiments.

More generally, referring to FIG. 10, the FAX signal processing unit 36 of FIG. 2 could be replaced by a more general purpose signal processing or passthrouqh unit 120, capable of processing or passing through any kind of information that can be sent over the DID telephone line, including FAX messages, voice, and modulated data. Unit 120 would be connected to a router 122 (like the personal computer of FIG. 2) which would route the incoming information to a FAX machine 124, answering machine 126, voice telephone 128, or modem 130, as indicated by the telephone address signal carried on the DID line. This facility could be implemented using the telephone company's Simplified Message Desk facility in which case it could also provide outbound service from multiple devices over the same line as well. As indicated by the dashed line box 131, one or more of the FAX, modem, or voice facilities could be served by a single integrated circuit board that could be installed, for example, in a personal computer. The board 131 could also contain the functions performed by router 122. In that arrangement, the incoming telephone address signal, instead of indicating the destination device of the incoming information, could indicate the mode of communication, e.g., voice or FAX or data. Then the router could send a command to cause board 131 to enter the proper mode to respond to and handle the information in the mode in which it is to be received.

Figure 11:
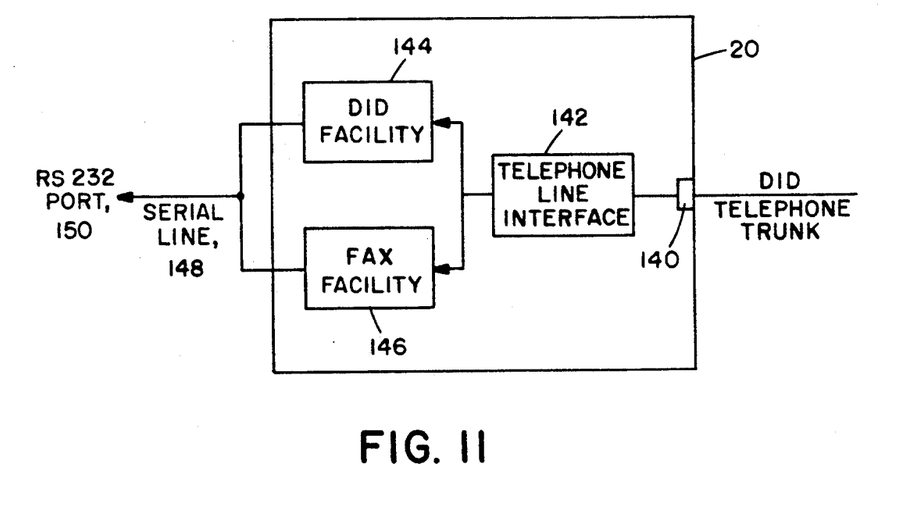

Referring to FIG. 11, FAX DID receiver 20 can be a self contained stand-alone board or unit which includes a jack 140 for a DID telephone trunk, a telephone line interface, a DID facility 144 capable of detecting DID address signals, a FAX facility 146 for receiving and processing FAX messages and a serial line 148 for delivering DID addresses and FAX messages via an RS 232 port 150 to, e.g., a personal computer.

We claim:

1. A method for causing information including at least a FAX message sent via a telephone system to be routed from a receiving station through a multinode computer network to a prespecified network location, the method comprising initiating a telephone call via the telephone system to the receiving station by dialing a telephone number enabling the telephone call to be routed to the receiving station, said telephone number also being sufficient to indicate the network location to which the FAX message is to be routed from the receiving station, passing said telephone number through the telephone system in the form of a telephone address signal as part of the call initiation process by which a telephone connection to the receiving station is established, directing the telephone call being initiated to the receiving station, based on the telephone address signal, answering the telephone call at the receiving station, and receiving at the receiving station at least part of the telephone address signal, storing network location information which associates network locations with telephone address signals, when the connection has been established, sending the FAX message via the telephone system to the receiving station, receiving the sent message at the receiving station and forwarding the received FAX message to a network location based on the telephone address signal.

2. The method of claim 1 wherein the network location is a mailbox associated with an intended recipient.

3. The method of claim 1 wherein the telephone address signal is a direct inward dialing (DID) telephone address signal.

4. The method of claim 1 wherein the receiving station handles received information in a FAX, voice or data mode specified by stored information associated with the telephone address signal.

5. A receiving station for causing at least a FAX message received via a telephone system to be routed from a receiving station through a multinode computer network to a prespecified network location, each said FAX message being received as a result of a telephone call initiated via the telephone system by a sender dialing a telephone number which enables the telephone call to be routed to the receiving station, said telephone number also being sufficient to indicate a network location to which the FAX message is to be routed from the receiving station, said telephone number being carried through the telephone system in the form of a telephone address signal as part of the call initiation process by which a telephone connection to the receiving station is established, said telephone call being directed to the receiving station, based on the telephone address signal, said receiving station comprising a message receiver for answering the telephone call, receiving the telephone address signal, and, when the call has been established, receiving the FAX message via the telephone system, storage for storing network location information which associates network locations with telephone address signals, said receiving station being arranged to route the received FAX message in accordance with the stored network location based on the telephone address signal.

6. The receiving station of claim 5 wherein said receiver has a telephone port for connection to a DID trunk line.

7. The receiving station of claim 5 wherein said receiver comprises a circuit board for insertion in a backplane of a personal computer.

8. The receiving station of claim 5 wherein mode of receipt and the receiving station handles a received message in a FAX, voice or data mode specified by the stored action information.

9. A stand alone FAX receiving station comprising a telephone jack for connection to a DID telephone trunk, a line for connection to a port of a digital processor, a telephone interface connected to the telephone jack, and a DID facility and a FAX facility both connected between the telephone jack and the line.

10. A method for causing different messages each of which is expressed in one of possibly any two of the modes—voice, FAX, and modulated data—and each of which is sent via a telephone system, to be handled in accordance with the proper mode at a receiving station, comprising
- initiating a telephone call via the telephone system to the receiving station by dialing a telephone number enabling the telephone call to be routed to the receiving station,
- passing said telephone number through the telephone system in the form of a telephone address signal as part of the call initiation process, said telephone address signal being indicative of said mode,
- directing the telephone call being initiated to the receiving station, based on the telephone address signal,
- answering the telephone call at the receiving station, and receiving at the receiving station at least part of the telephone address signal,
- storing mode information which associates with each possible telephone address signal, a prespecified mode with respect to each received message corresponding to said telephone address signal,
- when the call has been established, sending the message via the telephone system to the receiving station,
- receiving the sent message at the receiving station and handling the received message in accordance with the prespecified mode.

11. Apparatus for causing different messages each of which is expressed in one of possibly any two of
- the modes—voice, FAX, and modulated data—and each of which is sent via a telephone system, to be handled in accordance with the proper mode at a receiving station, said messages being sent as part of a telephone call initiated via the telephone system to a receiving station by dialing a telephone number enabling the telephone call to be routed to the receiving station, said telephone number being passed through the telephone system in the form of a telephone address signal as part of the call initiation process, said telephone address signal being indicative of the mode, said telephone call being initiated to the receiving station, based on the telephone address signal, when the call has been established, the message being sent via the telephone system to the receiving station, said apparatus comprising
- a receiving station for answering the telephone call and receiving the message and at least part of the telephone address signal,
- storage for storing mode information which associates with each possible telephone address signal, a prespecified mode with respect to each received message corresponding to said telephone address signal, and
- a control device for receiving the sent message at the receiving station and handling the received message in accordance with the prespecified mode.

12. A method for enabling information included in a telephone call that has been received by a computer network to be routed to a selected node of said computer network, comprising
- receiving a telephone address signal which was generated and passed through a telephone system as part of a call initiation process by which a telephone connection to the network was established for said telephone call, said telephone address signal both enabling said call to be routed to said network and indicating the identity of said selected node,
- converting said telephone address signal to a network address corresponding to the selected node, and
- automatically forwarding said information within said network to said selected node based on said network address signal.

13. A method for enabling direct access from a telephone system to a selected FAX compatible receiving station located at a node of a computer network, comprising
- answering a telephone call,
- receiving a telephone address signal which was generated and passed through said telephone system as part of a call initiation process by which a telephone connection to the network was established for said telephone call, said telephone address signal both enabling said call to be routed to said network and indicating the identity of said selected FAX receiving station on said network,
- when the telephone call has been established, receiving at said network a FAX message as part of said telephone call, and
- automatically forwarding said FAX message within said network to said selected FAX receiving station based on said telephone address signal.

14. A receiving station for causing a message received via a telephone system to be subjected to a prespecified action, each said message being received as a result of a telephone call initiated via the telephone system by a sender dialing a telephone number which enables the telephone call to be routed to the receiving station, said telephone number also being sufficient to indicate the prescribed action to which the message is to be subjected at the receiving station, said telephone number being carried through the telephone address signal as part of the call initiation process by which a telephone connection to the receiving station is established, said telephone call being directed to the receiving station based on the telephone address signal, said receiving station comprising:
- a message receiver, on a circuit board for insertion in the backplane of a personal computer, for receiving the telephone address signal, and, when the call has been established, receiving the message via the telephone system, and
- storage for storing action information which associated with telephone address signal, prespecified actions to be taken with respect to received messages corresponding to said telephone address signals,
- said message receiver being arranged to handle the received message in accordance with the prespecified action based on the telephone address signal.

15. The receiving station of claim 14 wherein said message receiver has a telephone port for connection to a DID trunk line.

16. The receiving station of claim 14 wherein the receiving station handles a received message in the FAX, voice or data mode specified by the stored action information.

* * * * *